1-6-1874
Re 5,724
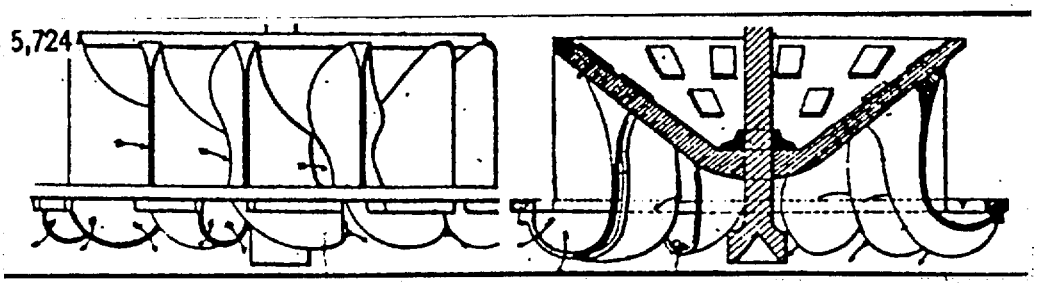

UNITED STATES PATENT OFFICE.

MATTHEW W. OBENCHAIN AND JOHN T. OBENCHAIN, OF LOGANSPORT, IND.

IMPROVEMENT IN TURBINE WATER-WHEELS.

Specification forming part of Letters Patent No. 122,275, dated December 26, 1871; reissue No. 5,724, dated January 6, 1874; application filed December 26, 1873.

*To all whom it may concern:*

Be it known that we, MATTHEW W. OBENCHAIN and JOHN T. OBENCHAIN, of Logansport, in the county of Cass and State of Indiana, have invented certain new and useful Improvements in Water-Wheels; and we do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of our invention relates to an invention in water-wheels; and it consists in casting each bucket separately, and attaching them to the hub in any suitable manner, and bracing or securing their lower ends together by means of a metal band or ring, which rests upon the tops of the shoulders formed on the sides of the buckets, and which also serves to make a water-tight joint with the casing. The lower end of each one of the buckets below this ring is of an ovoid form, and as each bucket is entirely separate from the other, the water has a central, a downward, and an outward, discharge.

In the accompanying drawings, Figure 1 is a side elevation of our invention, and Fig. 2 a vertical section of the same.

*a* represents the shaft of the wheel, to which the hub *c*, of any suitable form, is attached. To the under side of this hub are secured the buckets *d*, each one being made entirely separate by itself, and so placed in relation to each other that they in no place touch each other, but have a sufficient space left between their inner edges, as shown at *e*, Fig. 2, to form an inward or central discharge for the water. The lower end of each bucket is of an ovoid shape, and of a greater diameter or width at this point than any other, caused by the outward curving of the lower edge, as shown at *g*. The outer edge *i* of each bucket descends vertically from the outer edge of the hub, until it strikes this outward curve *g*, when it extends horizontally outward, forming a shoulder, *o*. Upon the tops of these shoulders, extending all around the wheel, is placed the iron band or ring *n*, which forms a brace or connection to bind the lower ends of the buckets together. This band is separated from the vertical edges of the buckets by a slight space or distance, *v*, and down in between the two there fits a flange formed on the casing.

The upper parts of the buckets are curved vertically, so that when the water strikes and fills them it acts upon them both by impact and pressure. By curving the lower ends of the buckets outward beyond the line at which the water strikes them, the water, in escaping downward and outward, acts upon the wheel by reaction.

Having thus described our invention, we claim—

1. The buckets of a water-wheel, connected by a band at their outer ends, and with a space, *v*, between the band and the vertical edges of the buckets to receive the flange of the wheel-casing, substantially as specified.

2. The buckets *d*, having vertical edges, and having their lower ends projecting outward beyond the vertical edges, so as to form shoulders *o*, substantially as shown and described.

In testimony that we claim the foregoing we have hereunto set our hands this 20th day of December, 1873.

MATTHEW W. OBENCHAIN.
JOHN T. OBENCHAIN.

Witnesses:
F. A. LEHMANN,
W. W. J. MURPHY.